(12) United States Patent
Nakajima et al.

(10) Patent No.: US 9,364,721 B2
(45) Date of Patent: Jun. 14, 2016

(54) GOLF BALL

(75) Inventors: Tsuyoshi Nakajima, Saitamaken (JP); Kazufumi Tabata, Saitamaken (JP); Yuichiro Ozawa, Saitamaken (JP); Takashi Ohira, Saitamaken (JP); Hiroshi Higuchi, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 889 days.

(21) Appl. No.: 13/461,217

(22) Filed: May 1, 2012

(65) Prior Publication Data

US 2013/0296072 A1 Nov. 7, 2013

(51) Int. Cl.
*A63B 37/06* (2006.01)
*A63B 37/00* (2006.01)
*C08K 5/14* (2006.01)

(52) U.S. Cl.
CPC ......... *A63B 37/0075* (2013.01); *A63B 37/0003* (2013.01); *A63B 37/0031* (2013.01); *A63B 37/0033* (2013.01); *A63B 37/0043* (2013.01); *A63B 37/0045* (2013.01); *A63B 37/0051* (2013.01); *A63B 37/0062* (2013.01); *A63B 37/0063* (2013.01); *A63B 37/0064* (2013.01); *A63B 37/0076* (2013.01); *A63B 37/0081* (2013.01); *A63B 37/0084* (2013.01); *A63B 37/0096* (2013.01); *C08K 5/14* (2013.01)

(58) Field of Classification Search
CPC ........................ A63B 37/0062; A63B 37/0063
USPC ........................................................ 473/377
See application file for complete search history.

(56) References Cited

U.S. PATENT DOCUMENTS

| | | | |
|---|---|---|---|
| 5,033,748 A * | 7/1991 | Ebisuno | ........................ 473/372 |
| 6,194,505 B1 | 2/2001 | Sone et al. | |
| 6,642,314 B2 | 11/2003 | Sone et al. | |
| 6,679,791 B2 | 1/2004 | Watanabe | |
| 7,273,425 B2 | 9/2007 | Higuchi | |
| 7,276,560 B2 | 10/2007 | Nanba et al. | |
| 7,278,929 B2 | 10/2007 | Umezawa et al. | |
| 7,294,680 B2 | 11/2007 | Sone et al. | |
| 7,300,362 B1 | 11/2007 | Umezawa et al. | |
| 7,335,115 B1 | 2/2008 | Watanabe et al. | |
| 7,381,776 B2 | 6/2008 | Nanba et al. | |
| 7,481,722 B2 | 1/2009 | Higuchi | |
| 7,909,710 B2 | 3/2011 | Higuchi et al. | |
| 2010/0331117 A1 * | 12/2010 | Sullivan et al. | ............... 473/377 |

(Continued)

FOREIGN PATENT DOCUMENTS

| | | |
|---|---|---|
| JP | 11-035633 A | 2/1999 |
| JP | 11-164912 A | 6/1999 |

(Continued)

*Primary Examiner* — Raeann Gorden
(74) *Attorney, Agent, or Firm* — Sughrue Mion, PLLC

(57) ABSTRACT

The invention provides a golf ball having a core and a cover of at least one layer. The core has a cross-sectional hardness which, letting ($H_{-14}$) be a JIS-C hardness at a position 14 mm in from a surface toward a center of the core, ($H_{-8}$) be a JIS-C hardness at a position 8 mm in from the surface toward the center of the core, ($H_{-6}$) be a JIS-C hardness at a position 6 mm in from the surface toward the center of the core, and ($H_{-4}$) be a JIS-C hardness at a position 4 mm in from the surface toward the center of the core, satisfies the formulas (1) $H_{-14}<70$, (2) $H_{-8}<72$, (3) $H_{-6}<75$, and (3) $H_{-4}-H_{-8}>8$.

13 Claims, 10 Drawing Sheets

(56) References Cited

U.S. PATENT DOCUMENTS

| | | |
|---|---|---|
| 2011/0159998 A1 | 6/2011 | Ohama et al. |
| 2011/0159999 A1 | 6/2011 | Ohama et al. |
| 2011/0250991 A1 | 10/2011 | Isogawa et al. |

FOREIGN PATENT DOCUMENTS

| | | |
|---|---|---|
| JP | 2002-000765 A | 1/2002 |
| JP | 2002-293996 A | 10/2002 |
| JP | 2006-167452 A | 6/2006 |
| JP | 2006-289074 A | 10/2006 |
| JP | 2006-312044 A | 11/2006 |
| JP | 2007-152090 A | 6/2007 |
| JP | 2007-167257 A | 7/2007 |
| JP | 2008-068077 A | 3/2008 |
| JP | 2008-119461 A | 5/2008 |
| JP | 2008-194473 A | 8/2008 |
| JP | 2010-188199 A | 9/2010 |
| JP | 2010-214105 A | 9/2010 |
| JP | 2011-136020 A | 7/2011 |
| JP | 2011-136021 A | 7/2011 |
| JP | 2011-217857 A | 11/2011 |

* cited by examiner

GOLF BALL

BACKGROUND OF THE INVENTION

The present invention relates to a golf ball having a core and a cover composed of at least one layer. More specifically, the invention relates to a golf ball which achieves satisfactory distances on shots with both drivers and middle irons used by professional golfers and skilled amateurs, and which also has an excellent durability to cracking when repeatedly struck.

Solid golf balls have a relatively simple inner structure composed of a core and a cover, although various golf ball properties such as rebound, feel, spin on approach shots and durability depend to a large degree on synergy between the core and the cover. In numerous disclosures to date, efforts have been made to optimize the rebound and feel of the ball, and also the spin rate of the ball on approach shots, by closely specifying the cross-sectional hardness of the core. Such art is described in, for example, the following technical literature: JP-A 2011-136020 (and the corresponding published U.S. Patent Application No. 2011/0159999), JP-A 2011-136021 (and the corresponding published U.S. Patent Application No. 2011/0159998), JP-A 2007-152090 (and the corresponding U.S. Pat. No. 7,273,425), JP-A 2008-194473 (and the corresponding U.S. Pat. No. 7,481,722), and JP-A 2010-214105 (and the corresponding U.S. Pat. No. 7,909,710).

In addition, numerous disclosures have been made on art which, in rubber compositions for golf ball cores, specifies the hardness profile of the core from the standpoint of the rubber formulation. For example, JP-A 2006-312044 (and the corresponding published U.S. Pat. No. 7,278,929) discloses art in which powdered sulfur is added so as to increase the hardness difference between the center and surface of the core to at least a given value. In addition, technical documents which describe rubber formulations created in order to adjust the hardness profile of the core include, for example, JP-A 2006-167452 (and the corresponding U.S. Pat. No. 7,276,560), JP-A 2006-289074 (and the corresponding U.S. Pat. No. 7,381,776), JP-A 2002-000765 (and the corresponding U.S. Pat. No. 6,679,791), JP-A 2010-188199 (and the corresponding U.S. Pat. No. 6,679,791, which is the same as the preceding), JP-A 2007-167257, JP-A 2008-68077 (and the corresponding U.S. Pat. No. 7,335,115), JP-A 2008-119461 (and the corresponding U.S. Pat. No. 7,300,362), and JP-A 2011-217857 (and the corresponding U.S. Patent Application No. 2011/0250991).

However, although a certain degree of improvement can be expected for conventional rubber formulations and core hardness profiles, even further increases in distance and improvements in durability are desired. Lately, research and development on golf balls has been especially intense and, in order to secure a competitive advantage with the ball, there has existed a desire to raise the level of the overall properties of the ball.

SUMMARY OF THE INVENTION

It is therefore an object of the invention to provide a golf ball which achieves satisfactory distances on shots with both drivers and middle irons used by professional golfers and skilled amateurs, and which also has an excellent durability to cracking when repeatedly struck.

As a result of extensive investigations aimed at achieving the above objects, the inventor has developed golf ball cores having cross-sectional hardnesses like those shown in FIGS. 3 and 4 of working examples of the invention; that is, cores which, in the cross-sectional hardness profiles thereof, have a cross-sectional hardness from the core center to a position at a given distance therefrom that is relatively soft and free of large fluctuations in hardness, and have a cross-sectional hardness thereafter up to the core surface that rises at a steep gradient. The inventor has discovered that golf balls having a core with such a cross-sectional hardness achieve satisfactory distances, both on shots with drivers and on shots with middle irons such as a number six iron (I#6), and are also cap of exhibiting an improved durability to cracking when repeatedly struck.

Among recent golf balls in particular, three-piece solid golf balls and four-piece solid golf balls featuring a urethane cover are widely used by professional golfers and skilled amateurs. The present invention, by optimizing the internal hardness profile of the core in the above ball, improves not only the distance achieved on shots with drivers used by professionals and skilled amateurs, but also the distance achieved with middle irons such as a number six iron (I#6) used by such golfers. Moreover, the invention provides a ball which, along with improving the distance performance, has an excellent durability to cracking when repeatedly struck and is capable of withstanding harsh conditions of use.

Accordingly, the invention provides the following golf ball.

[1] A golf ball comprising a core and a cover of at least one layer, wherein the core has a cross-sectional hardness which, letting ($H_{-14}$) be a JIS-C hardness at a position 14 mm in from a surface toward a center of the core, ($H_{-8}$) be a JIS-C hardness at a position 8 mm in from the surface toward the center of the core, ($H_{-6}$) be a JIS-C hardness at a position 6 mm in from the surface toward the center of the core, and ($H_{-4}$) be a JIS-C hardness at a position 4 mm in from the surface toward the center of the core, satisfies the formulas (1) to (4) below:

$$H_{-14} < 70 \tag{1}$$

$$H_{-8} < 72 \tag{2}$$

$$H_{-6} < 75, \tag{3}$$

and $$H_{-4} - H_{-8} > 8. \tag{4}$$

[2] The golf ball of [1], wherein the ball has a deflection, when compressed under a final load of 5,880 N (600 kgf) from an initial load state of 98 N (10 kgf), of from 7 to 10 mm.
[3] The golf ball of [1], wherein the core is formed of a rubber composition which includes an organic peroxide having a one-minute half-life temperature of from about 165° C. to about 185° C. and sulfur.
[4] The golf ball of [1], wherein the core has a diameter of from 32 to 41 mm.
[5] The golf ball of [1], wherein the core is composed of a single layer.

BRIEF DESCRIPTION OF THE DIAGRAMS

DETAILED DESCRIPTION OF THE INVENTION

Figure 1:
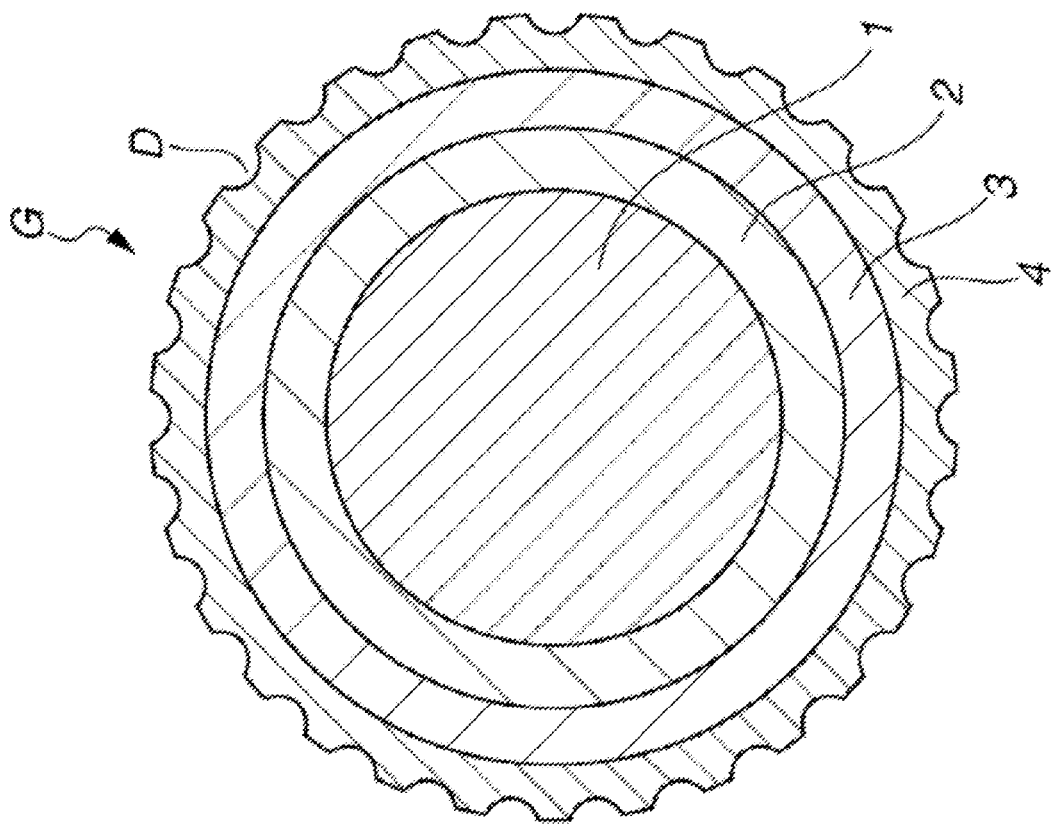
FIG. 1 is a cross-sectional view showing a golf ball according to one embodiment of the invention.

The present invention is described more fully below.

The golf ball of the invention has a construction which includes a core and a cover of at least one layer. As mentioned above, the core may be composed of a single layer or may be formed of a plurality of two or more layers, although it is preferable in this invention for the core to be composed of a single layer. Also, in this invention, the "cover" refers collectively to whatever layers are formed to the outside of the core, and is composed of at least one layer. That is, in cases where the cover is composed of a plurality of layers, in addition to the outermost layer of the cover, it includes also an intermediate layer interposed between the outermost layer and the core. Accordingly, the cover may be a two-layer cover composed of, in order from the inside: an intermediate layer and an outermost layer. In addition, an envelope layer may be provided between the core and the intermediate layer, in which case the cover may be a three-layer cover composed of, in order from the inside: an envelope layer, an intermediate layer and an outermost layer. A large number of dimples are generally formed on the outside surface of the outermost layer of the cover.

The core used in the invention is described. This core may be obtained by vulcanizing a rubber composition composed primarily of a rubber material. No particular limitation is imposed on the rubber composition. In a preferred embodiment, the core may be formed using a composition containing, for example, a base rubber, a co-crosslinking agent, a crosslinking initiator, sulfur, an organosulfur compound, a filler and an antioxidant.

When the above rubber component is polybutadiene, the polybutadiene must be one having a cis-1,4 bond content of at least 60% (here and below, "%" refers to percent by weight), preferably at least 80%, more preferably at least 90%, and most preferably at least 95%. If the cis-1,4 bond content is too low, the resilience will decrease. In addition, the polybutadiene has a 1,2-vinyl bond content of preferably not more than 2%, more preferably not more than 1.7%, and even more preferably not more than 1.5%.

The polybutadiene has a Mooney viscosity ($ML_{1+4}$ (100° C.)) of preferably at least 30, and more preferably at least 35, with the upper limit being preferably not more than 100, and more preferably not more than 90.

The term "Mooney viscosity" used herein refers to an industrial indicator of viscosity (JIS K6300) as measured with a Mooney viscometer, which is a type of rotary plastometer. This value is represented by the unit symbol $ML_{1+4}$ (100° C.), wherein "M" stands for Mooney viscosity, "L" stands for large rotor (L-type), and "1+4" stands for a pre-heating time of 1 minute and a rotor rotation time of 4 minutes. The "100° C." indicates that measurement was carried out at a temperature of 100° C.

From the standpoint of obtaining a molded and vulcanized rubber composition having a good resilience, the polybutadiene is preferably one synthesized with a rare-earth catalyst or a group VIII metal compound catalyst.

Such rare-earth catalysts are not subject to any particular limitation, although preferred use may be made of a lanthanum series rare-earth compound. Also, where necessary, an organoaluminum compound, an alumoxane, a halogen-bearing compound and a Lewis base may be used in combination with a lanthanum-series rare-earth compound. Preferred use may be made of, as the various foregoing compounds, those mentioned in JP-A 11-35633, JP-A 11-164912 and JP-A 2002-293996.

Of the above rare-earth catalysts, the use of a catalyst which employs any of the lanthanum series rare-earth elements neodymium, samarium and gadolinium is preferred, with the use of a neodymium catalyst being especially recommended. In such cases, a polybutadiene rubber having a high 1,4-cis bond content and a low 1,2-vinyl bond content can be obtained at an excellent polymerization activity.

The polybutadiene has a molecular weight distribution Mw/Mn (where "Mw" stands for weight-average molecular weight, and "Mn" stands for number-average molecular weight) of preferably at least 1.0, and more preferably at least 1.3. The upper limit is preferably not more than 6.0, and more preferably not more than 5.0. If Mw/Mn is too small, the workability may decrease, whereas if it is too large, the resilience may decline.

The above polybutadiene is used as the base rubber, in which case the proportion of the polybutadiene within the overall rubber is preferably at least 40 wt %, more preferably at least 60 wt %, even more preferably at least 80 wt %, and most preferably at least 90 wt %. The above polybutadiene may account for 100 wt %, preferably 98 wt % or less, and even more preferably 95 wt % or less, of the base rubber.

Examples of cis-1,4-polybutadiene rubber that may be used include the high-cis products BR01, BR11, BR02, BR02L, BR02LL, BR730 and BR51 available from JSR Corporation.

Rubber components other than the above-described polybutadiene may also be included in the base rubber, insofar as the objects of the invention can be achieved. Illustrative examples of such other rubber components include polybutadienes other than the above polybutadiene, and other diene rubbers, such as styrene-butadiene rubbers, natural rubbers, isoprene rubbers and ethylene-propylene-diene rubbers.

The co-crosslinking agent is not subject to any particular limitation in this invention. Illustrative examples include unsaturated carboxylic acids, and the metal salts of unsaturated carboxylic acids. Examples of suitable unsaturated carboxylic acids include acrylic acid, methacrylic acid, maleic acid and fumaric acid. The use of acrylic acid or methacrylic acid is especially preferred. The metal salts of unsaturated carboxylic acids are exemplified by the above unsaturated carboxylic acids which have been neutralized with a desired metal ion. Illustrative examples include the zinc salts and magnesium salts of methacrylic acid and acrylic acid. The use of zinc acrylate is especially preferred. The content of these unsaturated carboxylic acids and/or metal salts thereof per 100 parts by weight of the base rubber is preferably at least 10 parts by weight, more preferably at least 15 parts by weight, and even more preferably at least 20 parts by weight. The upper limit is preferably not more than 45 parts by weight, more preferably not more than 43 parts by weight, and even more preferably not more than 41 parts by weight.

An organic peroxide is preferably used as the crosslinking initiator. Specifically, the use of an organic peroxide having a relatively high thermal decomposition temperature is preferred. For example, an organic peroxide having an elevated one-minute half-life temperature of from about 165° C. to about 185° C., such as a dialkyl peroxide, may be used. Illustrative examples of dialkyl peroxides include dicumyl peroxide ("Percumyl D," from NOF Corporation), 2,5-dimethyl-2,5-di(t-butylperoxy)hexane ("Perhexa 25B," from NOF Corporation), and di(2-t-butylperoxyisopropyl)benzene ("Perbutyl P," from NOF Corporation). Preferred use can be made of dicumyl peroxide. These may be used singly or two or more may be used in combination. The half-life is one indicator of the organic peroxide decomposition rate, and is expressed as the time required for the original organic peroxide to decompose and the active oxygen content therein to fall to one-half. The vulcanization temperature for the core-forming rubber composition is generally in a range of from 120 to 190° C. Within this range, the thermal decomposition of high-temperature organic peroxides having a one-minute half-life temperature of about 165° C. to about 185° C. is relatively slow. With the rubber composition of the invention, by regulating the amount of free radicals generated, which increases as the vulcanization time elapses, a crosslinked rubber core having a specific internal hardness profile is obtained.

The crosslinking initiator is included in an amount, per 100 parts by weight of the base rubber, of preferably at least 0.1 part by weight, more preferably at least 0.2 part by weight, and even more preferably at least 0.3 part by weight. The upper limit is preferably not more than 5.0 parts by weight, more preferably not more than 4.0 parts by weight, even more preferably not more than 3.0 parts by weight, and most preferably not more than 2.0 parts by weight. Including too much may make the core too hard, resulting in an unpleasant feel at impact, and may markedly lower the durability to cracking. On the other hand, if the amount included is too small, the core may become too soft, resulting in an unpleasant feel at impact and markedly lowering productivity.

Fillers that may be preferably used include zinc oxide, barium sulfate and calcium carbonate. These may be used singly or two or more may be used in combination. The amount of filler included per 100 parts by weight of the base rubber may be set to preferably at least 1 part by weight, and more preferably at least 3 parts by weight. The upper limit in the amount included per 100 parts by weight of the base rubber may be set to preferably not more than 200 parts by weight, more preferably not more than 150 parts by weight, and even more preferably not more than 100 parts by weight. At a filler content which is too high or too low, a proper weight and a suitable rebound may be impossible to obtain.

In the practice of the invention, an antioxidant is included in the rubber composition. For example, use may be made of a commercial product such as Nocrac NS-6, Nocrac NS-30 or Nocrac 200 (all products of Ouchi Shinko Chemical Industry Co., Ltd.). These may be used singly, or two or more may be used in combination.

The amount of antioxidant included per 100 parts by weight of the base rubber, although not subject to any particular limitation, is preferably at least 0.05 part by weight, and more preferably at least 0.1 part by weight. The upper limit is preferably not more than 1.0 part by weight, more preferably not more than 0.7 part by weight, and even more preferably not more than 0.4 part by weight. If the antioxidant content is too high or too low, a suitable core hardness gradient may not be obtained, as a result of which it may not be possible to obtain a good rebound, durability, and spin rate-lowering effect on full shots.

Sulfur may be optionally included in the rubber composition. The sulfur is exemplified by the product available from Tsurumi Chemical Industry Co., Ltd. under the trade name "Sulfax-5." The amount of sulfur included can be set to more than 0, and may be set to preferably at least 0.005 part by weight, and more preferably at least 0.01 part by weight, per 100 parts by weight of the base rubber. The upper limit in the amount of sulfur, although not subject to any particular limitation, may be set to preferably not more than 0.5 part by weight, more preferably not more than 0.4 part by weight, and even more preferably not more than 0.1 part by weight. By adding sulfur, hardness differences in the core can be increased. However, adding too much sulfur may result in undesirable effects during hot molding, such as explosion of the rubber composition, or may considerably lower the rebound.

In addition, an organosulfur compound may be included in the rubber composition so as to impart an excellent rebound. Thiophenols, thionaphthols, halogenated thiophenols, and metal salts thereof are recommended for this purpose. Illustrative examples include pentachlorothiophenol, pentafluorothiophenol, pentabromothiophenol, p-chlorothiophenol, and the zinc salt of pentachlorothiophenol; and diphenylpolysulfides, dibenzylpolysulfides, dibenzoylpolysulfides, dibenzothiazoylpolysulfides and dithiobenzoylpolysulfides having 2 to 4 sulfurs. The use of diphenyldisulfide or the zinc salt of pentachlorothiophenol is especially preferred.

The amount of the organosulfur compound included per 100 parts by weight of the base rubber is at least 0.05 part by weight, preferably at least 0.07 part by weight, and more preferably at least 0.1 part by weight. The upper limit is not more than 5 parts by weight, preferably not more than 4 parts by weight, more preferably not more than 3 parts by weight, and most preferably not more than 2 parts by weight. Including too much organosulfur compound may excessively lower the hardness, whereas including too little is unlikely to improve the rebound.

The core can be produced by vulcanizing and curing the rubber composition containing the various above ingredients. For example, production may be carried out by using a mixing apparatus such as a Banbury mixer or a roll mill to mix the ingredients, carrying out compression molding or injection molding using a core-forming mold, then suitably heating, and thereby curing, the molded body at a temperature sufficient for the organic peroxide and the co-crosslinking agent to act, such as from about 100° C. to about 200° C. for a period of 10 to 40 minutes.

The core diameter, although not subject to any particular limitation, is preferably at least 32 mm, and more preferably at least 33 mm. The upper limit is preferably not more than 41 mm, and more preferably not more than 40 mm. At a core diameter outside of this range, the ball's durability to cracking may dramatically decline, or the initial velocity of the ball may decrease.

It is critical for the above core to have a cross-sectional hardness which, letting ($H_{-14}$) be a JIS-C hardness at a position 14 mm in from a surface toward a center of the core, ($H_{-8}$) be a JIS-C hardness at a position 8 mm in from the surface toward the center of the core, ($H_{-6}$) be a JIS-C hardness at a position 6 mm in from the surface toward the center of the core, and ($H_{-4}$) be a JIS-C hardness at a position 4 mm in from the surface toward the center of the core, satisfies the formulas (1) to (4) below:

$$H_{-14} < 70 \tag{1}$$

$$H_{-8} < 72 \tag{2}$$

$$H_{-6} < 75, \tag{3}$$

and $$H_{-4} - H_{-8} > 8. \tag{4}$$

By adjusting the cross-sectional hardness of the core so as to satisfy the foregoing formulas; that is, conceptually, by finishing the core to a hardness profile in which the cross-sectional hardness from the core center to a position at a given distance therefrom is relatively soft and free of large fluctuations in hardness and in which the subsequent cross-sectional hardness up to the core surface rises at a steep gradient, excessive deformation of the core on full shots with a driver or with a middle iron is suppressed, core deformation is optimized, and a loss of initial velocity and an increase in the spin rate can be suppressed. As a result, satisfactory distances can be obtained on shots with drivers and on shots with middle irons such as a I#6 used by professional golfers and skilled amateurs, in addition to which the durability to cracking on repeated impact can be improved.

In above formula (1), if the $H_{-14}$ value is too large, a sufficient spin rate-lowering effect may not be obtained, as a result of which the desired distance may not be achieved. The $H_{-8}$ value has an upper limit of preferably not more than 70, more preferably not more than 68, and even more preferably not more than 65, and a lower limit of preferably at least 50, more preferably at least 54, and even more preferably at least 58.

In above formula (2), if the $H_{-8}$ value is too large, a sufficient spin rate-lowering effect may not be obtained, as a result of which the desired distance may not be achieved. The $H_{-8}$ value has an upper limit of preferably not more than 72, more preferably not more than 70, and even more preferably not more than 68, and a lower limit of preferably at least 54, more preferably at least 58, and even more preferably at least 62.

In above formula (3), if the $H_{-6}$ value is too large, a sufficient spin rate-lowering effect may not be obtained, as a result of which the desired distance may not be achieved. The $H_{-6}$ value has an upper limit of preferably not more than 75, more preferably not more than 74, and even more preferably not more than 73, and a lower limit of preferably at least 56, more preferably at least 60, and even more preferably at least 64.

In above formula (4), if the $H_{-4}-H_{-8}$ value is too small, a sufficient spin rate-lowering effect may not be obtained, as a result of which the intended distance may not be achieved. The $H_{-4}-H_{-8}$ value has a lower limit of at least 8, and preferably at least 9, and an upper limit of preferably not more than 20, and more preferably not more than 18.

The JIS-C hardness difference between the surface of the core and the center of the core has a lower limit of preferably at least 10, more preferably at least 12, and even more preferably at least 14, and an upper limit of preferably not more than 45, more preferably not more than 40, and even more preferably not more than 35. If the above value is too large, a good initial velocity may not be obtained and the durability may worsen. On the other hand, if the above value is too small, the spin rate may rise excessively, resulting in a poor distance, and the feel at impact may harden. The JIS-C hardness at the core center, although not subject to any particular limitation, has a minimum value of preferably at least 50, more preferably at least 52, and even more preferably at least 54, and a maximum value of preferably not more than 70, more preferably not more than 68, and even more preferably not more than 66. The JIS-C hardness at the core surface, although not subject to any particular limitation, has a minimum value of preferably at least 75, more preferably at least 77, and even more preferably at least 79, and a maximum value of preferably not more than 100, more preferably not more than 98, and even more preferably not more than 96.

The JIS-C hardness difference between the $H_{-14}$ value and the center of the core has a lower limit of preferably at least $-4$, and more preferably at least $-2$, and an upper limit of preferably not more than 6, and more preferably not more than 4. If the above value is too large, the initial velocity of the ball may become smaller, as a result of which the desired distance may not be achieved. On the other hand, if the above value is too small, a sufficient spin rate-lowering effect may not be obtained, as a result of which the desired distance may not be achieved.

The JIS-C hardness difference between the surface of the core and the $H_{-14}$ value has a lower limit of preferably at least 16, and more preferably at least 17, and an upper limit of preferably not more than 35, more preferably not more than 34, and even more preferably not more than 33. If the above value is too large, a good initial velocity may not be achieved or the durability may worsen. On the other hand, if the above value is too small, the spin rate may rise excessively, as a result of which a good distance may not be achieved, or the feel at impact may harden.

The JIS-C hardness difference between the surface of the core and the $H_{-8}$ value has a lower limit of preferably at least 11, more preferably at least 12, and even more preferably at least 13, and an upper limit of preferably not more than 30, more preferably not more than 29, and even more preferably not more than 28. If the above value is too large, a good initial velocity may not be achieved or the durability may worsen. On the other hand, if the above value is too small, the spin rate may rise excessively, as a result of which a good distance may not be achieved, or the feel at impact may harden.

No particular limitation is imposed on the method for adjusting the cross-sectional hardness in order to have the core satisfy the above formulas, although a core having the desired cross-sectional hardness can be obtained by suitably adjusting the core rubber formulation and the vulcanization temperature and time. For example, a core which satisfies the above formulas can be obtained by adjusting the type and content of the above-described organic peroxide and by adjusting the vulcanization conditions. Specifically, by using both an organic peroxide capable of decomposing at a high temperature and also sulfur as rubber compounding ingredients in the core, the desired cross-sectional hardness of this invention can easily be achieved.

In the cover used in this invention, the material making up the outermost layer, although not subject to any particular limitation, is exemplified by ionomers and polyurethanes.

From the standpoint of controllability and scuff resistance, it is preferable to use a polyurethane as the outermost layer material. The use of a thermoplastic polyurethane elastomer in particular is preferred from the standpoint of amenability to mass production.

In cases where the outermost layer material is a thermoplastic polyurethane elastomer, it is preferable to use one type of resin pellet composed of a resin blend in which the main components are (A) a thermoplastic polyurethane and (B) a polyisocyanate compound and, when the resin pellets are charged into an injection molding machine just prior to injection molding, it is preferable for at least some isocyanate compound to be present in which all the isocyanate groups on the molecule remain in an unreacted state. Golf balls composed of such thermoplastic polyurethane elastomers have an excellent rebound, spin performance and scuff resistance.

To fully and effectively achieve the objects of the invention, a necessary and sufficient amount of unreacted isocyanate groups should be present within the outermost layer-forming resin material. Specifically, it is recommended that the total weight of components A and B combined be preferably at least 60%, and more preferably at least 70%, of the overall weight of the outermost layer. Above components A and B are described in detail below.

In describing the thermoplastic polyurethane (A), the structure of this thermoplastic polyurethane includes soft segments composed of a polymeric polyol that is a long-chain polyol (polymeric glycol), and hard segments composed of a chain extender and a polyisocyanate compound. Here, the long-chain polyol serving as a starting material is not subject to any particular limitation, and may be any that is used in the prior art relating to thermoplastic polyurethanes. Exemplary long-chain polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly or as combinations of two or more thereof. Of the long-chain polyols mentioned here, polyether polyols are preferred because they enable the synthesis of thermoplastic polyurethanes having a high rebound resilience and excellent low-temperature properties.

Illustrative examples of the above polyether polyol include poly(ethylene glycol), poly(propylene glycol), poly(tetramethylene glycol) and poly(methyltetramethylene glycol) obtained by the ring-opening polymerization of cyclic ethers. The polyether polyol may be used singly or as a combination of two or more thereof. Of the above, poly(tetramethylene glycol) and/or poly(methyltetramethylene glycol) are preferred.

It is preferable for these long-chain polyols to have a number-average molecular weight in the range of 1,500 to 5,000. By using a long-chain polyol having such a number-average molecular weight, golf balls made with a thermoplastic polyurethane composition having excellent properties such as resilience and manufacturability can be reliably obtained. The number-average molecular weight of the long-chain polyol is more preferably in the range of 1,700 to 4,000, and even more preferably in the range of 1,900 to 3,000.

The number-average molecular weight of the long-chain polyol refers here to the number-average molecular weight computed based on the hydroxyl number measured in accordance with JIS K-1557.

Chain extenders that may be suitably used include those employed in the prior art relating to thermoplastic polyurethanes. For example, low-molecular-weight compounds which have a molecular weight of 400 or less and bear on the molecule two or more active hydrogen atoms capable of reacting with isocyanate groups are preferred. Examples of the chain extender include, but are not limited to, 1,4-butylene glycol, 1,2-ethylene glycol, 1,3-butanediol, 1,6-hexanediol and 2,2-dimethyl-1,3-propanediol. Of these chain extenders, aliphatic diols having 2 to 12 carbons are preferred, and 1,4-butylene glycol is more preferred.

The polyisocyanate compound is not subject to any particular limitation; preferred use may be made of one that is used in the prior art relating to thermoplastic polyurethanes. Specific examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane serving as above component A to be a thermoplastic polyurethane synthesized using a polyether polyol as the long-chain polyol, using an aliphatic diol as the chain extender, and using an aromatic diisocyanate as the polyisocyanate compound. It is desirable, though not essential, for the polyether polyol to be a polytetramethylene glycol having a number-average molecular weight of at least 1,900, for the chain extender to be 1,4-butylene glycol, and for the aromatic diisocyanate to be 4,4'-diphenylmethane diisocyanate.

The mixing ratio of active hydrogen atoms to isocyanate groups in the above polyurethane-forming reaction may be adjusted within a desirable range so as to make it possible to obtain a golf ball which is composed of a thermoplastic polyurethane composition and has various improved properties, such as rebound, spin performance, scuff resistance and manufacturability. Specifically, in preparing a thermoplastic polyurethane by reacting the above long-chain polyol, polyisocyanate compound and chain extender, it is desirable to use the respective components in proportions such that the amount of isocyanate groups on the polyisocyanate compound per mole of active hydrogen atoms on the long-chain polyol and the chain extender is from 0.95 to 1.05 moles.

No particular limitation is imposed on the method of preparing the thermoplastic polyurethane used as component A. Production may be carried out by either a prepolymer process or a one-shot process which uses a long-chain polyol, a chain extender and a polyisocyanate compound and employs a known urethane-forming reaction. Of these, a process in which melt polymerization is carried out in a substantially solvent-free state is preferred. Production by continuous melt polymerization using a multiple screw extruder is especially preferred.

It is also possible to use a commercially available product as the thermoplastic polyurethane serving as component A. Illustrative examples include Pandex T8295, Pandex T8290, Pandex T8283 and Pandex T8260 (all available from DIC Bayer Polymer, Ltd.).

Next, various types of isocyanates may be employed without particular limitation as the polyisocyanate compound serving as component B. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Of the above group of isocyanates, the use of 4,4'-diphenylmethane diisocyanate, dicyclohexylmethane diisocyanate and isophorone diisocyanate is preferable in terms of the balance between the influence on processability of, e.g., the rise in viscosity accompanying the reaction with the thermoplastic polyurethane serving as component A and the physical properties of the outermost layer material of the resulting golf ball.

A thermoplastic elastomer (component C) other than the above-described thermoplastic polyurethane may be included as an optional component together with components A and B. By including this component C in the above resin blend, the flow properties of the resin blend can be further increased and improvements can be made in various properties required of the outermost layer material of a golf ball, such as resilience and scuff resistance.

The thermoplastic elastomer other than the above thermoplastic polyurethane which is used as component C may be of one, two or more types selected from among polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. In particular, because they increase the resilience and scuff resistance due to reaction with the isocyanate groups while at the same time maintaining a good productivity, the use of polyester elastomers, polyamide elastomers and polyacetals is especially preferred.

The above components A, B and C have a compositional ratio, expressed as a weight ratio, which, although not subject to any particular limitation, is preferably A:B:C=100:2 to 50:0 to 50, and more preferably A:B:C=100:2 to 30:8 to 50.

In the present invention, the resin blend is prepared by mixing together component A, component B and, additionally, component C. At this time, it is essential to select conditions such that, of the polyisocyanate compound, there exists at least some portion in which all the isocyanate groups remain in an unreacted state. For example, a treatment such as mixture in an inert gas such as nitrogen or in a vacuum state must be provided. This resin blend is then injection-molded around a core that has been placed in a mold. For easy and trouble-free handling, it is preferable to form the resin blend into pellets having a length of 1 to 10 mm and a diameter of 0.5 to 5 mm. Isocyanate groups in an unreacted state remain within these resin pellets; while the resin blend is being injection-molded about the core, or due to post-treatment such as annealing thereafter, the unreacted isocyanate groups react with component A and component C to form a crosslinked material.

The outermost layer may be molded by a method which involves, for example, feeding the above-described resin blend to an injection-molding machine, and injecting the molten resin blend over the core. In this case, the molding temperature varies depending on the type of thermoplastic polyurethane, but is preferably in the range of 150 to 250° C.

When injection molding is carried out, it is desirable though not essential to carry out molding in a low-humidity environment such as by purging with an inert gas (e.g., nitrogen) or a low-temperature gas (e.g., low dew-point dry air), or vacuum treating, some or all places on the resin paths from the resin feed area to the mold interior. Preferred, non-limiting, examples of the medium used for transporting the resin under applied pressure include low-humidity gases such as low dew-point dry air or nitrogen. By carrying out molding in such a low-humidity environment, reaction by the isocyanate groups is kept from proceeding before the resin has been charged into the mold interior. As a result, polyisocyanate in which the isocyanate groups are to some degree in an unreacted state is included in the molded resin material, thus making it possible to reduce variable factors such as an unwanted rise in viscosity and enabling the real crosslinking efficiency to be enhanced.

Techniques that may be used to confirm the presence of polyisocyanate compound in an unreacted state within the resin blend prior to injection molding about the core include those which involve extraction with a suitable solvent that selectively dissolves out only the polyisocyanate compound. An example of a simple and convenient method is one in which confirmation is carried out by simultaneous thermogravimetric and differential thermal analysis (TG-DTA) measurement in an inert atmosphere. For example, when the resin blend (outermost layer material) which may be used in this invention is heated in a nitrogen atmosphere at a temperature ramp-up rate of 10° C./min, a gradual drop in the weight of diphenylmethane diisocyanate can be observed from about 150° C. On the other hand, in a resin sample in which the reaction between the thermoplastic polyurethane material and the isocyanate mixture has been carried out to completion, a weight drop is not observed from about 150° C., but a weight drop can be confirmed from about 230 to 240° C.

After the resin blend has been molded as described above, the properties as a golf ball outermost layer can be additionally improved by carrying out annealing so as to induce the crosslinking reaction to proceed further. "Annealing," as used herein, refers to aging the cover in a fixed environment for a fixed length of time.

In addition to the above-described resin components, various additives may be optionally included in the outermost layer material in the invention. Examples of such additives include pigments, dispersants, antioxidants, ultraviolet absorbers, ultraviolet stabilizers, parting agents, plasticizers, and inorganic fillers (e.g., zinc oxide, barium sulfate, titanium dioxide, tungsten).

Next, the thickness of the outermost layer in this invention, although not particularly limited, is preferably at least 0.1 mm, more preferably at least 0.3 mm, and even more preferably at least 0.5 mm. The maximum thickness is preferably not more than 1.4 mm, more preferably not more than 1.2 mm, and even more preferably not more than 1.0 mm. If the outermost layer is thicker than the above range, the rebound on W#1 shots may be inadequate or the spin rate may increase, possibly resulting in a poor distance. If the outermost layer is thinner than the above range, the scuff resistance may worsen, or the controllability even by professional golfers and skilled amateurs may be inadequate.

The material hardness of the outermost layer, expressed as the Shore D hardness, although not particularly limited, is preferably at least 34, more preferably at least 37, and even more preferably at least 40. The maximum value is preferably not more than 66, more preferably not more than 63, and even more preferably not more than 60. At a low Shore D hardness, the ball may be too receptive to spin on full shots, possibly resulting in a poor distance. At a Shore D hardness which is too high, the ball may not be receptive to spin on approach shots, which may result in a poor controllability even by professional golfers and skilled amateurs. It should be noted here that the material hardness of the outermost layer refers to the hardness when the material has been molded into a sheet of a given thickness. Below, the material hardnesses of the intermediate layer and the envelope layer are defined in the same way.

In the golf ball of the invention, numerous dimples are provided on the surface of the outermost layer for the sake of aerodynamic performance. The number of dimples formed on the outermost layer surface is not subject to any particular limitation. However, to enhance the aerodynamic performance of the ball and increase the distance traveled by the ball, the number of dimples is preferably at least 250, more preferably at least 270, even more preferably at least 290, and most preferably at least 300. The maximum number of dimples is preferably not more than 400, more preferably not more than 380, and even more preferably not more than 360.

In the practice of the invention, by further increasing the number of layers in the ball structure, it is possible to improve the ball performance to a level desired in particular by professional golfers and skilled amateurs. For example, an intermediate layer may be interposed between the above-described core and the above-described outermost layer, although the invention is not limited to this construction.

In the above case, the material hardness of the intermediate layer, expressed as the Shore D hardness, although not particularly limited, is preferably at least 50, more preferably at least 55, and even more preferably at least 60. The upper limit is preferably not more than 70, more preferably not more than 66, and even more preferably not more than 63. If the material hardness of the intermediate layer is too low, the ball as a whole may be too receptive to spin on full shots, as a result of which a good distance may not be achieved. On the other hand, if the material hardness of the intermediate layer is too high, the durability to cracking when repeatedly struck may worsen or the feel at impact on shots with a putter or on short approach shots may be too hard.

From the standpoint of lowering the spin rate both on shots with a driver and on shots with a middle iron, it is preferable for the JIS-C hardness at the surface of a sphere composed of the core covered by the intermediate layer to be at least 90.

The thickness of the intermediate layer, although not particularly limited, is preferably at least 0.5 mm, more preferably at least 0.7 mm, and even more preferably at least 0.9 mm. The upper limit is preferably not more than 2.0 mm, and more preferably not more than 1.7 mm. If the thickness of the intermediate layer is larger than the above range, the spin rate-lowering effect on shots with a W#1 may be inadequate, as a result of which a good distance may not be obtained. If the intermediate layer is too thin, the ball may have a poor durability to cracking when repeatedly struck and a poor durability at low temperatures.

The intermediate layer material is not subject to any particular limitation. For example, advantageous use may be made of known ionomer resins, thermoplastic elastomers and thermoset elastomers. Illustrative examples of thermoplastic elastomers include various types of thermoplastic elastomers, such as polyester elastomers, polyamide elastomers, polyurethane elastomers, olefin elastomers and styrene elastomers. It is especially preferable to use an ionomer resin as the base resin for the intermediate layer material. In this case, it is desirable that formulation of the ionomer resin composition involve using a mixture of a zinc ion ($Zn^{2+}$)-neutralized ionomer resin and a sodium ion (NaI-neutralized ionomer resin. The mixing ratio therebetween, or zinc ion ($Zn^{2+}$-neutralized ionomer resin (I)/sodium ion ($Na^+$)-neutralized ionomer resin (II), expressed in terms of weight percent, is preferably from 25/75 to 75/25, more preferably from 35/65 to 65/35, and even more preferably from 45/55 to 55/45. If the (I)/(II) resin ratio does not satisfy the above range, there is a possibility that the rebound of the overall ball will become smaller, which may make it impossible to obtain the desired flight performance. Moreover, the durability to cracking when repeatedly struck at ordinary temperatures may worsen, and the durability to cracking at low temperatures (sub-zero Celsius) may also worsen.

It is preferable to subject the surface of the intermediate layer to abrasion treatment so as to increase adhesion with the outermost layer located on the outside thereof. In addition, following such abrasion treatment, a primer may be applied to the surface. It is also possible to increase adhesion by adding an adhesion reinforcing agent to the intermediate layer material.

In the practice of the invention, in addition to the above intermediate layer, an envelope layer may be provided between the core and the intermediate layer. In such a case, there is obtained a multi-piece solid golf ball G having a four-layer construction which, as shown in FIG. 1, is composed of, in order from the inside: a core 1, an envelope layer 2, an intermediate layer 3, and an outermost layer 4 having numerous dimples D on the surface thereof.

In the above case, the envelope layer has a material hardness, expressed as the Shore D hardness, which is not particularly limited, but is preferably at least 40, more preferably at least 42, and even more preferably at least 44. The upper limit is preferably not more than 61, more preferably not more than 59, and even more preferably not more than 57. If the material hardness of the envelope layer is too low, the overall ball may be too receptive to spin on full shots, as a result of which a good distance may not be achieved. On the other hand, if the material hardness of the envelope layer is too high, the durability to cracking when repeatedly struck may worsen, or the ball may have a hard feel at impact.

The thickness of the envelope layer, although not particularly limited, is preferably at least 1.0 mm, more preferably at least 1.2 mm, and even more preferably at least 1.4 mm. The upper limit is preferably not more than 4.0 mm, more preferably not more than 3.0 mm, and even more preferably not more than 2.0 mm. At an envelope layer thickness greater than the above range, the initial velocity of the ball may be inadequate even when struck with a driver, as a result of which the desired distance may not be achieved. On the other hand, if the envelope layer is too thin, the spin rate-lowering effect may be inadequate, as a result of which the desired distance may not be achieved.

Although no particular limitation is imposed on the envelope layer material, preferred use may be made of, for example, a known ionomer resin, a thermoplastic elastomer, or a thermoset elastomer. Illustrative examples of thermoplastic elastomers include various types of thermoplastic elastomers, such as polyester elastomers, polyamide elastomers, polyurethane elastomers, olefin elastomers and styrene elastomers.

It is especially preferable to use, as the envelope layer material, a mixture obtained by compounding (f) a base resin of (a) an olefin-unsaturated carboxylic acid random copolymer and/or a metal ion neutralization product of an olefin-unsaturated carboxylic acid random copolymer blended with (b) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio of from 100:0 to 0:100, (e) a non-ionomeric thermoplastic elastomer, (c) from 5 to 80 parts by weight of a fatty acid and/or fatty acid derivative having a molecular weight of from 228 to 1500, and (d) from 0.1 to 17 parts by weight of a basic metal compound capable of neutralizing un-neutralized acid groups in the above base resin and component (c). In this case, it is preferable for the weight ratio of the base resin (f) to the non-ionomeric thermoplastic elastomer (e) to be adjusted within the range of 100:0 to 100:100, and for a mixture of component (f), component (c) and component (d) to be prepared, and it is also preferable to use all of above components (c), (d), (e) and (f). In this way, the ball rebound and flight performance can be further improved.

In this invention, commercially available products may be used as the base resins of components (a) and (b). Examples of commercial products which may be used as the random copolymer in component (a) include Nucrel 1560, Nucrel 1214 and Nucrel 1035 (all products of DuPont-Mitsui Polychemicals Co., Ltd.), and Escor 5200, Escor 5100 and Escor 5000 (all products of ExxonMobil Chemical). Examples of commercial products which may be used as the random copolymer in component (b) include Nucrel AN4311, Nucrel AN4318 (both products of DuPont-Mitsui Polychemicals Co., Ltd.), and Escor ATX325, Escor ATX320 and Escor ATX310 (all products of ExxonMobil Chemical).

Examples of commercial products which may be used as the metal ion neutralization product of the random copolymer in component (a) include Himilan 1554, Himilan 1557, Himilan 1601, Himilan 1605, Himilan 1706 and Himilan AM7311 (all products of DuPont-Mitsui Polychemicals Co., Ltd.), Surlyn 7930 (E.I. DuPont de Nemours & Co.), and Iotek 3110 and Iotek 4200 (ExxonMobil Chemical). Examples of commercial products which may be used as the metal ion neutralization product of the random copolymer in component (b) include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E.I. DuPont de Nemours & Co.), and Iotek 7510 and Iotek 7520 (both products of ExxonMobil Chemical). Examples of zinc-neutralized ionomer resins which are preferred as the metal ion neutralization product of the above random copolymers include Himilan 1706, Himilan 1557 and Himilan AM7316.

Above component (c) is a fatty acid and/or fatty acid derivative having a molecular weight of at least 228 but not more than 1500. This component has a very small molecular weight compared with the base resin. It suitably adjusts the melt viscosity of the mixture, and thus helps in particular to improve the flow properties. Component (c) of this invention includes a relatively high content of acid groups (or derivatives thereof), and is able to suppress an excessive loss of resilience. Illustrative examples of the fatty acid of component (c) include myristic acid, palmitic acid, stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred. Behenic acid is especially preferred.

Preferred use may be made of a basic inorganic metal compound as the basic metal compound of component (d). Illustrative examples of the metal ion therein include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. Known basic inorganic fillers containing these metal ions may be used as the basic inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. In particular, a hydroxide or a monoxide is recommended. Calcium hydroxide and magnesium oxide, each of which has a high reactivity with the base resin, are more preferred. Calcium hydroxide is especially preferred.

Illustrative examples of component (e) include olefin elastomers, styrene elastomers, polyester elastomers, urethane elastomers and polyamide elastomers. From the standpoint of further increasing rebound, the use of an olefin elastomer or a polyester elastomer is especially preferred. A commercially available product may be used as component (e). Examples include olefin elastomers such as Dynaron (JSR Corporation), and polyester elastomers such as Hytrel (DuPont-Toray Co., Ltd.).

Various additives such as pigments, dispersants, antioxidants, ultraviolet absorbers and light stabilizers may be optionally included in the thermoplastic resin. Specific examples of such additives include inorganic fillers such as zinc oxide, barium sulfate and titanium dioxide.

The above material may be obtained by mixing the various above-described components under applied heat. For example, the material may be obtained by using a known mixing apparatus such as a kneading-type twin-screw extruder, a Banbury mixer or a kneader to knead the ingredients at a heating temperature of from 150 to 250° C. Alternatively, direct use may be made of a commercial product, specific examples of which include those having the trade names HPF 1000, HPF 2000 and HPF AD1027, as well as the experimental material HPF SEP1264-3, all produced by E.I. DuPont de Nemours & Co.

The method of manufacturing multi-piece solid golf balls in which the above-described core, envelope layer, intermediate layer and outermost layer are each formed as successive layers is not subject to any particular limitation. Production may be carried out by an ordinary method such as a known injection molding process. By way of illustration, first a core is placed within a given injection mold, following which the envelope layer material is injection-molded over the core to form a first intermediate sphere, which sphere is then placed in another injection mold and the intermediate layer material is injection-molded over the sphere to form a second intermediate sphere. Next, this second intermediate sphere is placed in yet another injection mold and the outermost layer material is injection-molded over the second intermediate sphere, concurrent with which dimples are molded in the outermost layer surface, thereby giving a multi-piece golf ball. Alternatively, instead of the above method in which the materials for the respective layers are injection-molded, use may made of a method in which each of the respective intermediate spheres is enclosed by two half-cups that have been molded beforehand into hemispherical shapes, and the resulting assembly is molded under applied heat and pressure.

The golf ball of the invention has a diameter of not less than 42 mm, preferably not less than 42.3 mm, and more preferably not less than 42.6. The upper limit in the diameter is not more than 44 mm, preferably not more than 43.8 mm, more preferably not more than 43.5 mm, and even more preferably not more than 43 mm.

The weight of the golf ball is preferably not less than 44.5 g, more preferably not less than 44.7 g, even more preferably not less than 45.1 g, and most preferably not less than 45.2 g. The upper limit in the weight is not more than 47.0 g, more preferably not more than 46.5 g, and even more preferably not more than 46.0 g.

The golf ball has a deflection when subjected to a compressive load such that the ball deflection when compressed under a final load of 5,880 N (600 kgf) from an initial load state of 98 N (10 kgf) is preferably from 7 to 10 mm, with the lower limit being preferably at least 7.1 mm, more preferably at least 7.2 mm, and even more preferably at least 7.3 mm. If the ball deflection is too small, the feel at impact may harden and the spin rate may rise excessively, as a result of which the desired distance may not be achieved. On the other hand, if the deflection is too large, the ball may not have a good initial velocity and the durability may worsen.

As explained above, the golf ball of this invention provides satisfactory distances on shots with both drivers and middle irons (e.g., I#6) used by professional golfers and skilled amateurs, and also has an excellent durability to cracking when repeatedly struck.

EXAMPLES

Examples of the invention and Comparative Examples are given below by way of illustration, and not by way of limitation.

Examples 1 and 2, Comparative Examples 1 to 5

Golf ball cores were produced by using the rubber formulations in the respective examples of the invention and comparative examples as shown in Table 1 below to prepare core compositions, then molding and vulcanizing the core compositions under the vulcanization conditions in the table. With regard to the core in Comparative Example 5, changes in the hardness profile were effected by impregnating the molded and vulcanized core with an acrylic acid impregnating solution.

TABLE 1

|  | Example | | Comparative Example | | | | |
|---|---|---|---|---|---|---|---|
|  | 1 | 2 | 1 | 2 | 3 | 4 | 5 |
| Polybutadiene A | 80 | 80 |  | 95 | 100 | 100 | 50 |
| Polybutadiene C |  |  | 20 |  |  |  | 50 |
| Polyisoprene rubber |  |  |  | 5 |  |  |  |
| Polybutadiene B | 20 | 20 | 80 |  |  |  |  |
| Peroxide (1) | 1.05 | 0.75 |  | 3.0 | 0.3 |  | 0.6 |
| Peroxide (2) |  |  | 1.2 |  | 0.3 | 3.0 | 0.6 |
| Barium sulfate |  |  | 23.4 |  |  |  | 21.0 |
| Zinc oxide | 27.4 | 19.9 | 4.0 | 20.5 | 10.4 | 7.2 | 5.0 |
| Antioxidant | 0.2 | 0.2 | 0.1 |  | 0.1 | 0.1 | 0.1 |
| Zinc acrylate | 36.6 | 33.0 | 34.0 | 37.5 | 34.0 | 40.0 | 23.5 |
| Zinc stearate | 5 | 5 |  | 5 | 5 | 5 |  |
| Sulfur | 0.085 | 0.06 |  | 0.1 |  | 0.1 |  |
| Zinc salt of pentachloro-thiophenol | 0.4 | 0.4 | 0.6 | 1.5 | 1.0 | 1.5 | 0.1 |
| Vulcanization temperature (° C.) | 155 | 155 | 155 | 155 | 160 | 160 | 150 |
| Vulcanization time (min) | 21 | 21 | 13 | 15 | 13 | 13 | 15 |

Numbers in the table indicate parts by weight.

Details on the above materials are given below.

Polybutadiene A: Available under the trade name "BR730" from JSR Corporation

Polybutadiene B: Available under the trade name "BR51" from JSR Corporation

Polybutadiene C: Available under the trade name "BR01" from JSR Corporation

Polyisoprene rubber: Available under the trade name "IR2200" from JSR Corporation Peroxide (1): Dicumyl peroxide, available under the trade name "Percumyl D" from NOF Corporation Peroxide (2): A mixture of 1,1-di(t-butylperoxy)-cyclohexane and silica, available under the trade name "Perhexa C-40" from NOF Corporation Antioxidant: 2,2-Methylenebis(4-methyl-6-butylphenol), available under the trade name "Nocrac NS-6" from Ouchi Shinko Chemical Industry Co., Ltd.

Zinc stearate: Available under the trade name "Zinc Stearate G" from NOF Corporation Sulfur: Available under the trade name "Sulfax-5" from Tsurumi Chemical Industry Co., Ltd.

Figure 2:
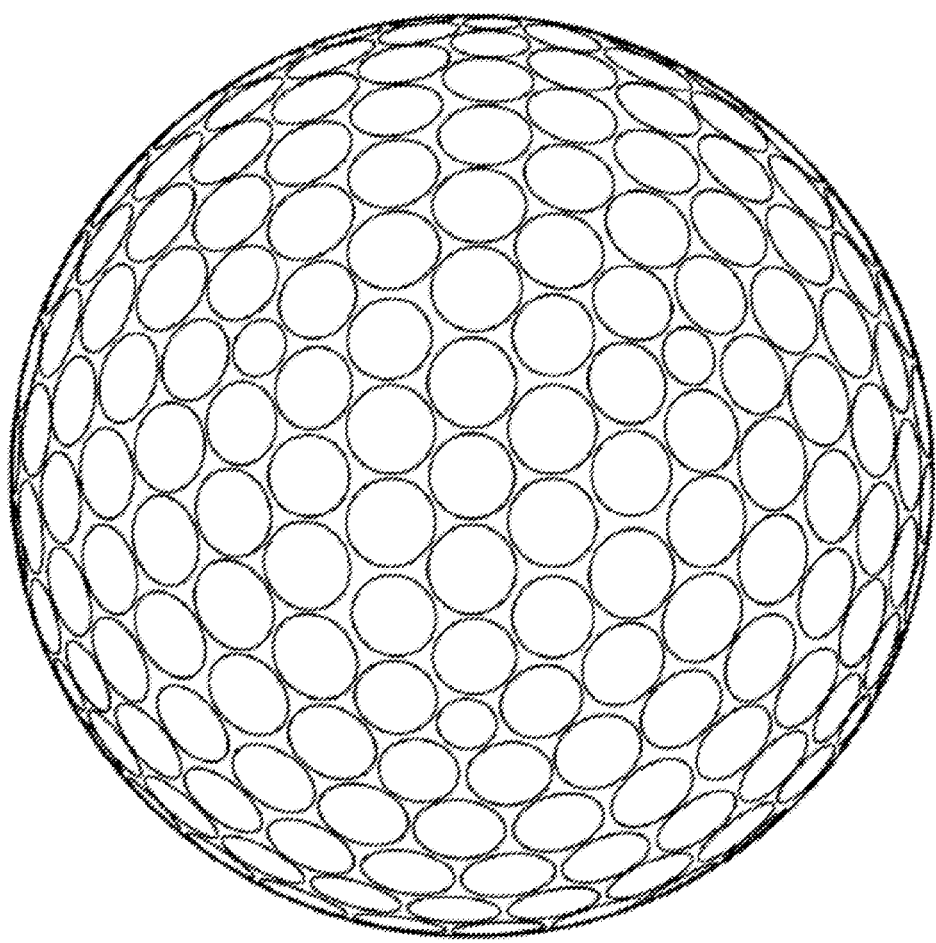
FIG. 2 is a plan view showing the dimples used in the working examples of the invention and the comparative examples.
Figure 3:
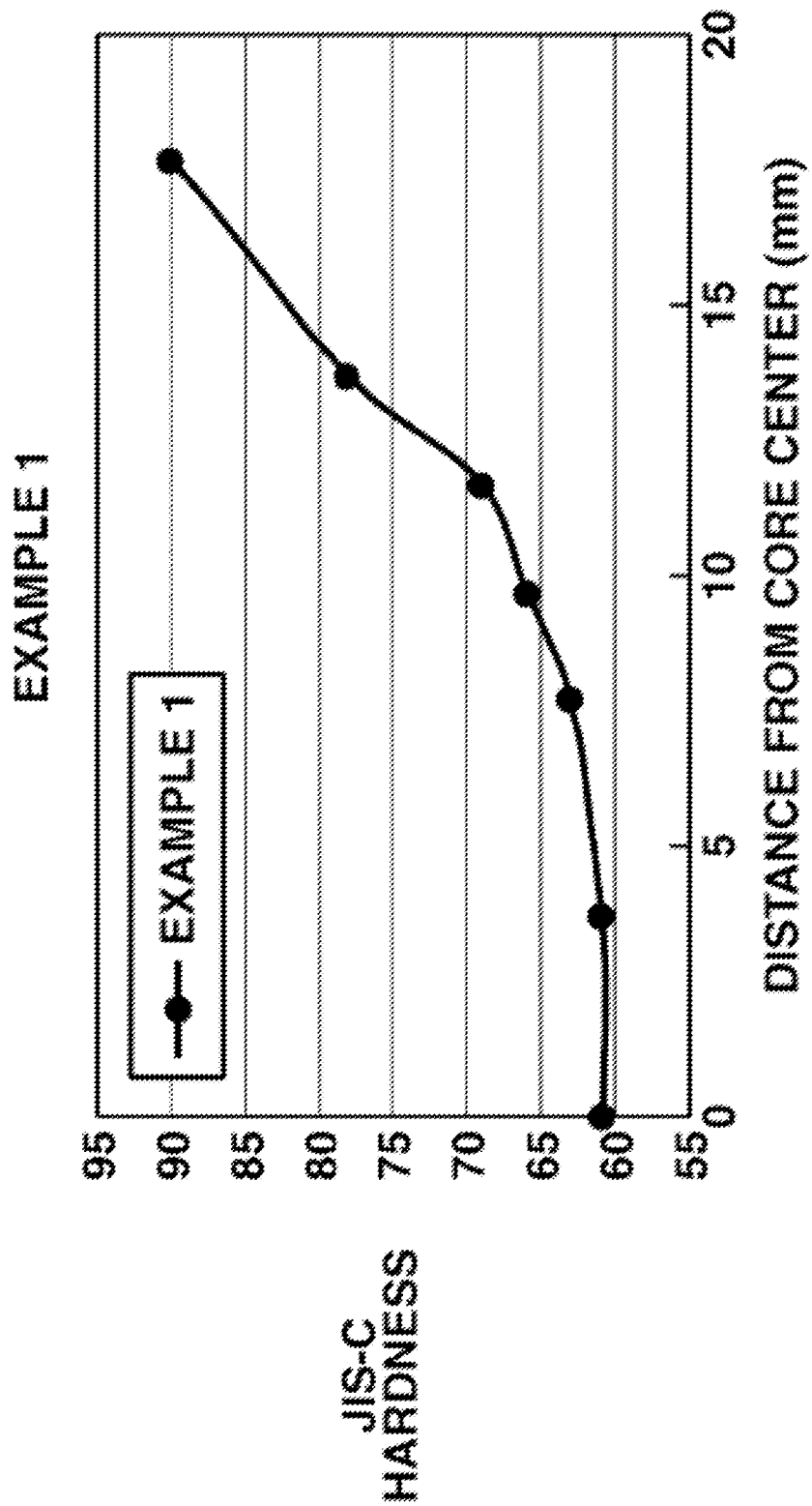
FIG. 3 is a graph showing the cross-sectional hardness profile of the core used in Example 1.
Figure 4:
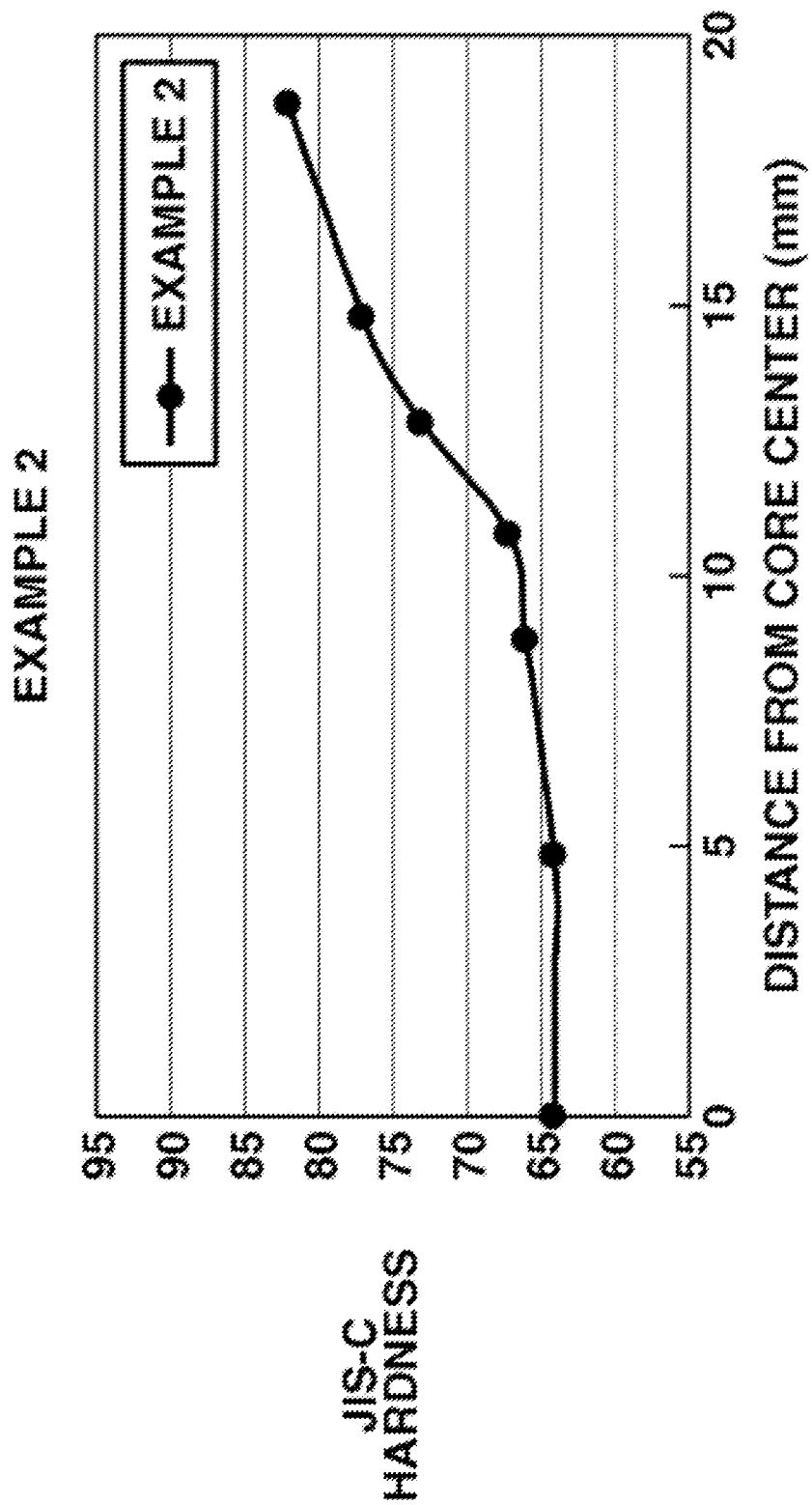
FIG. 4 is a graph showing the cross-sectional hardness profile of the core used in Example 2.
Figure 5:
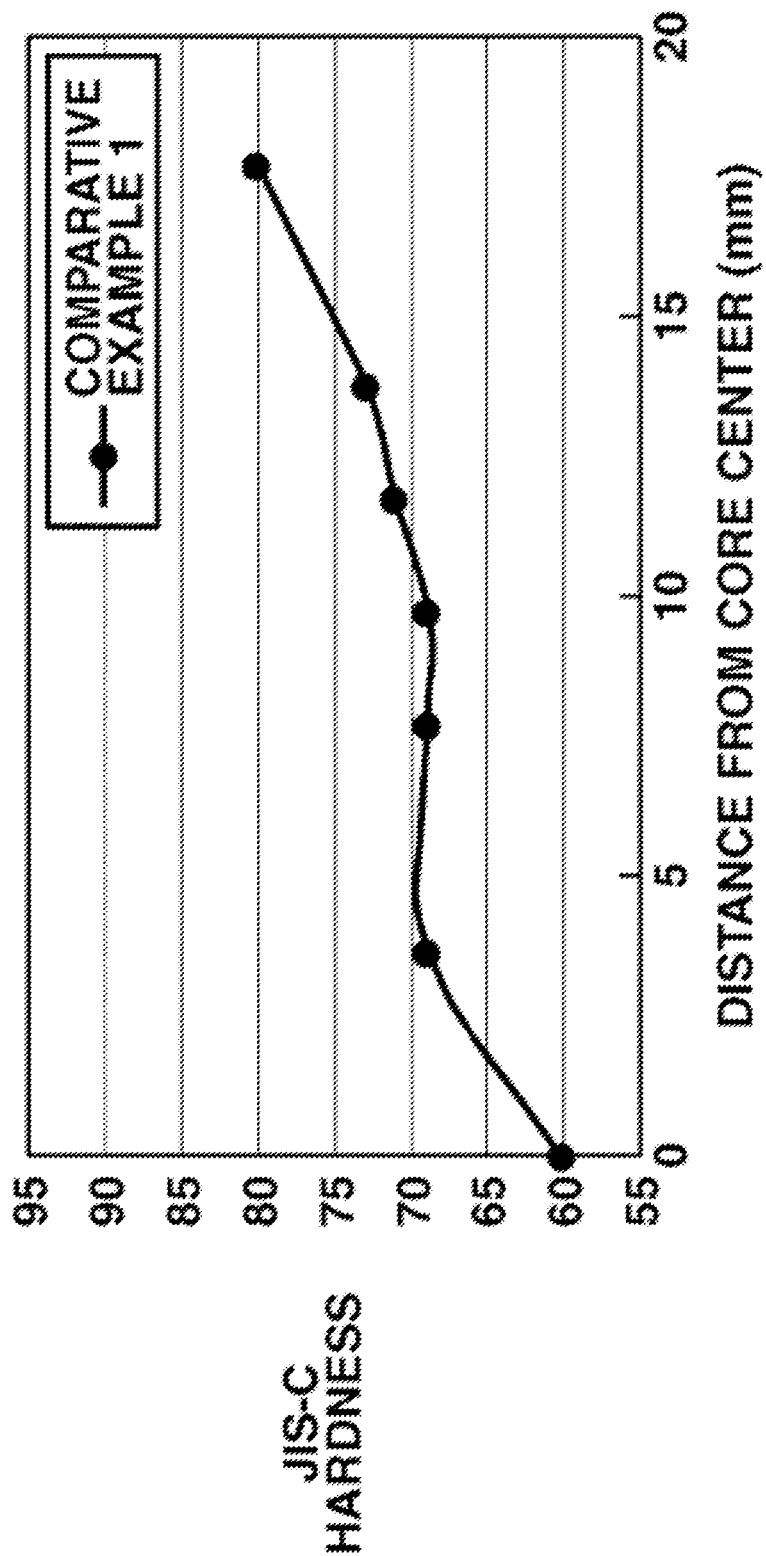
FIG. 5 is a graph showing the cross-sectional hardness profile of the core used in Comparative Example 1.
Figure 6:
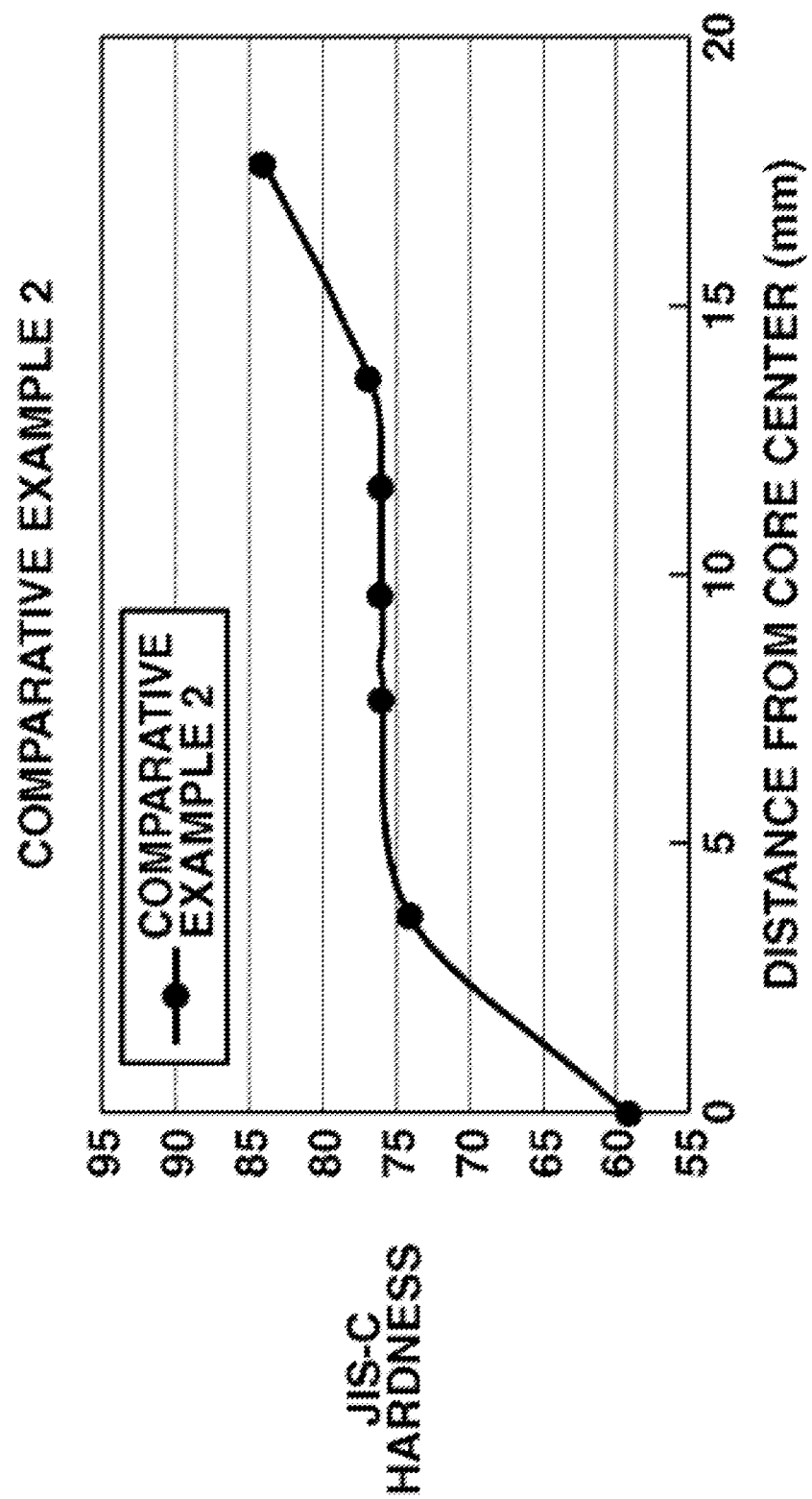
FIG. 6 is a graph showing the cross-sectional hardness profile of the core used in Comparative Example 2.
Figure 7:
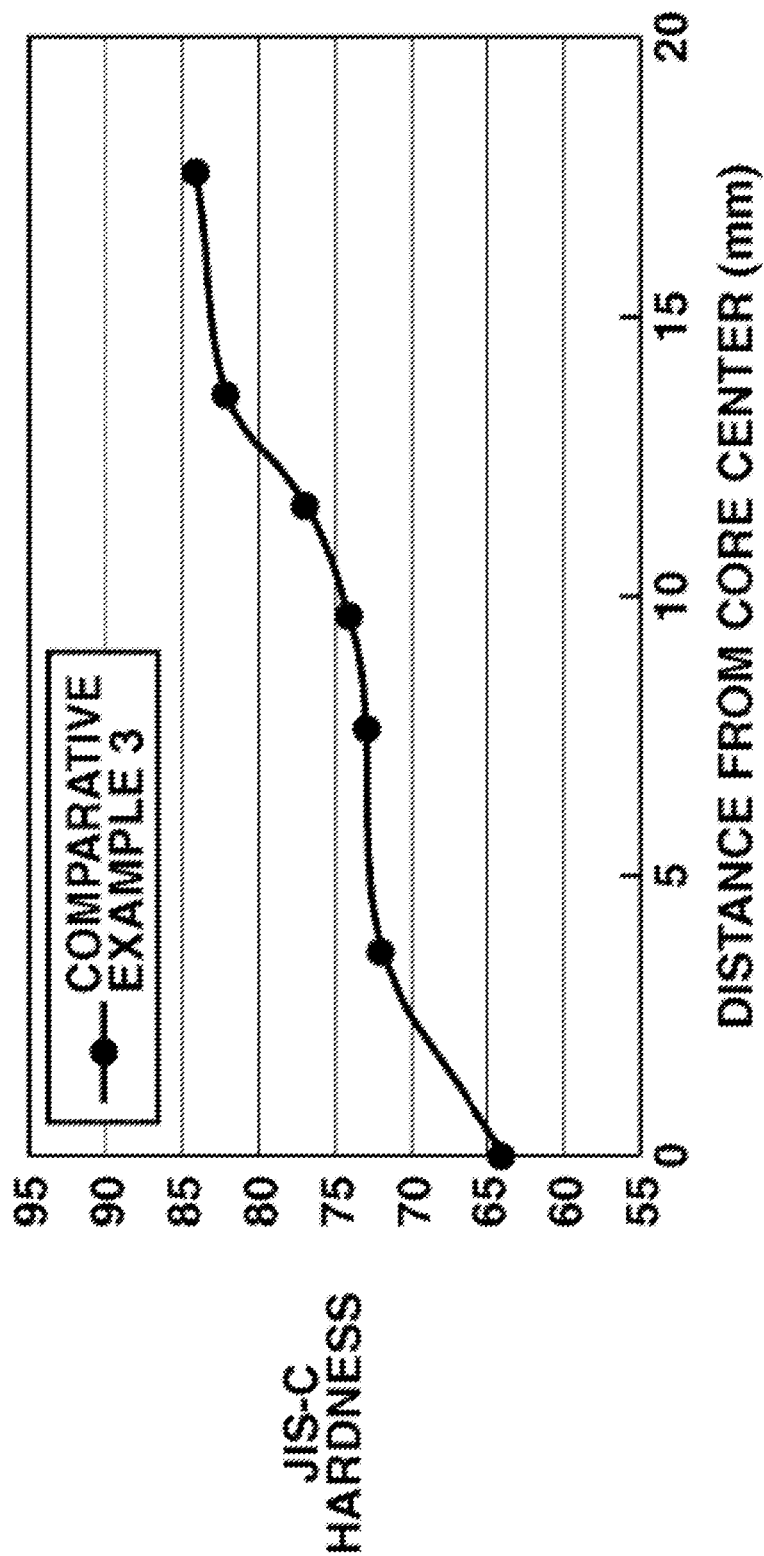
FIG. 7 is a graph showing the cross-sectional hardness profile of the core used in Comparative Example 3.
Figure 8:
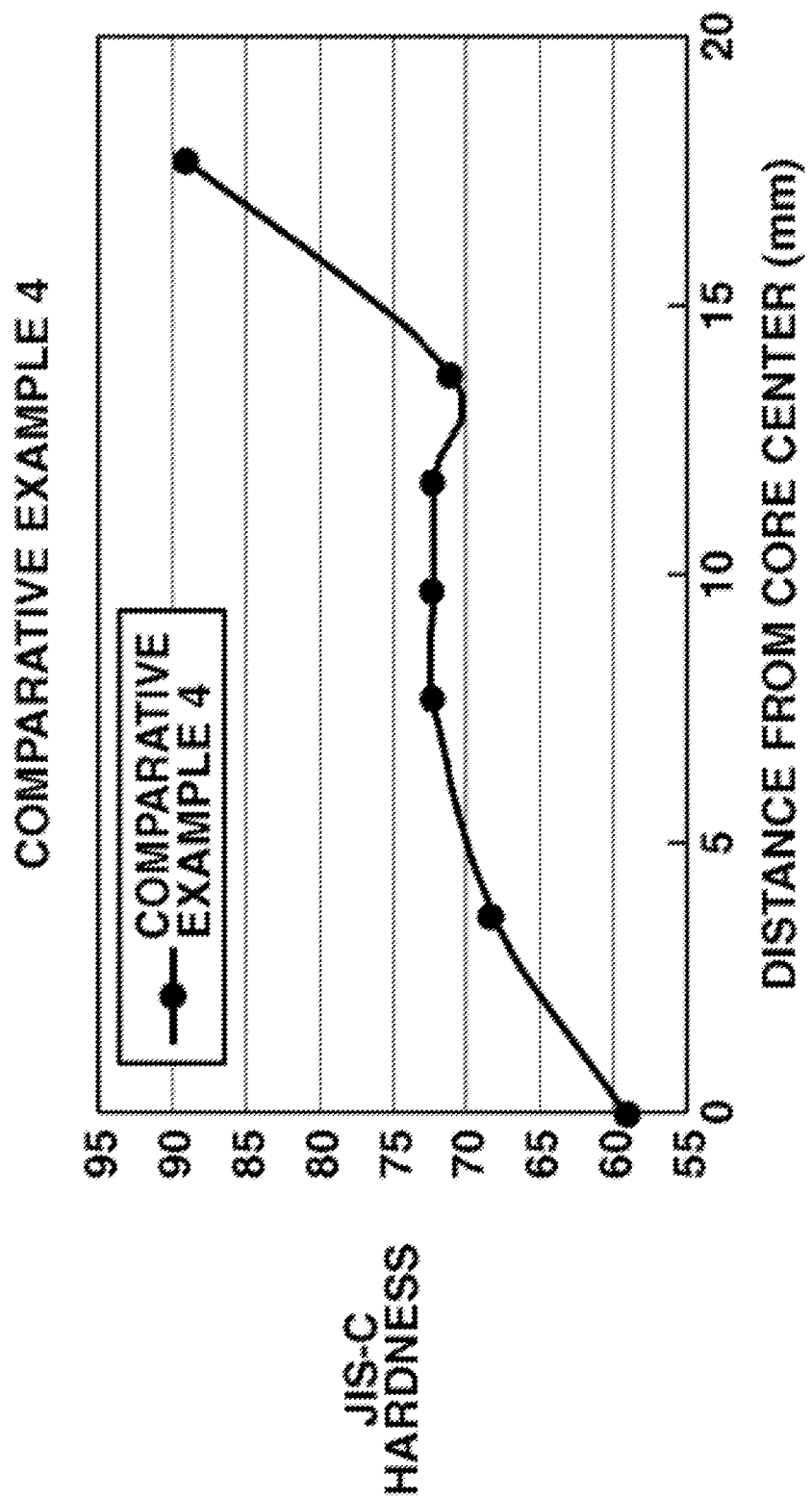
FIG. 8 is a graph showing the cross-sectional hardness profile of the core used in Comparative Example 4.
Figure 9:
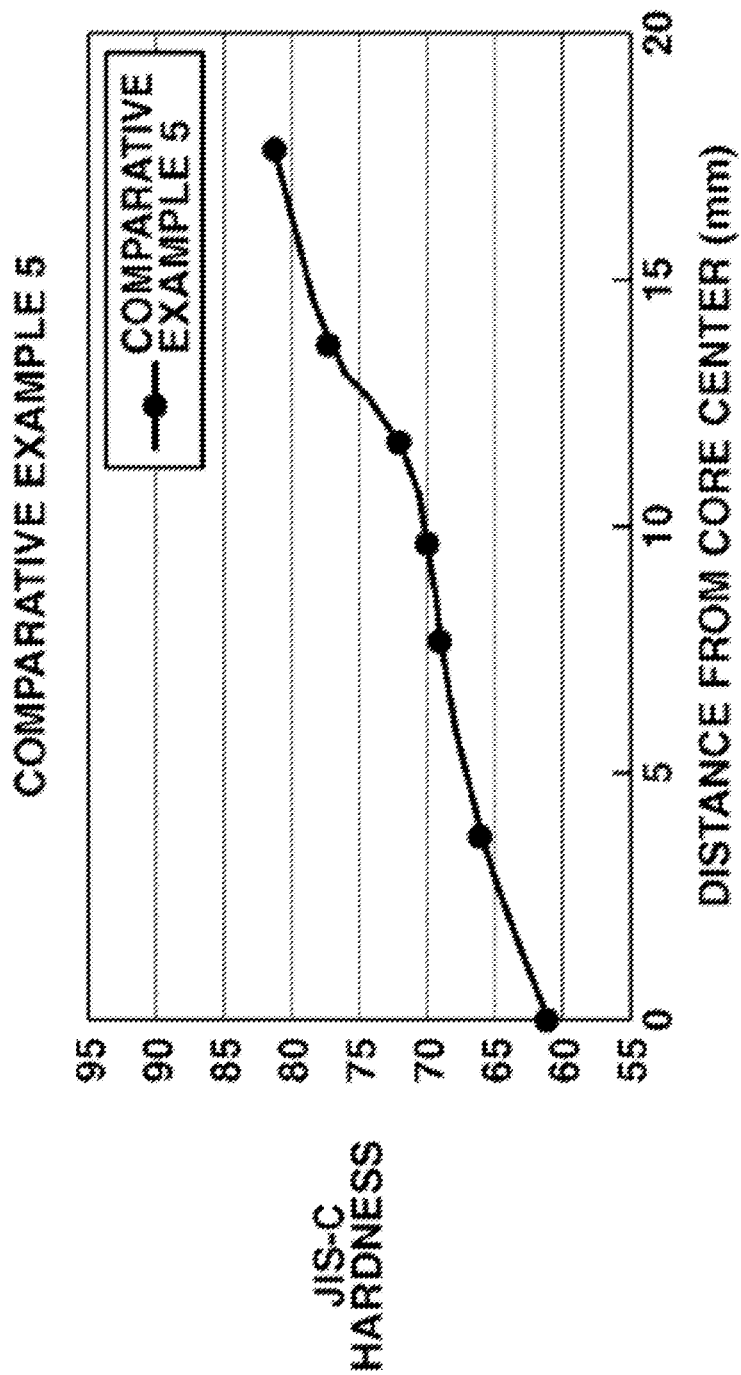
FIG. 9 is a graph showing the cross-sectional hardness profile of the core used in Comparative Example 5.
Figure 10:
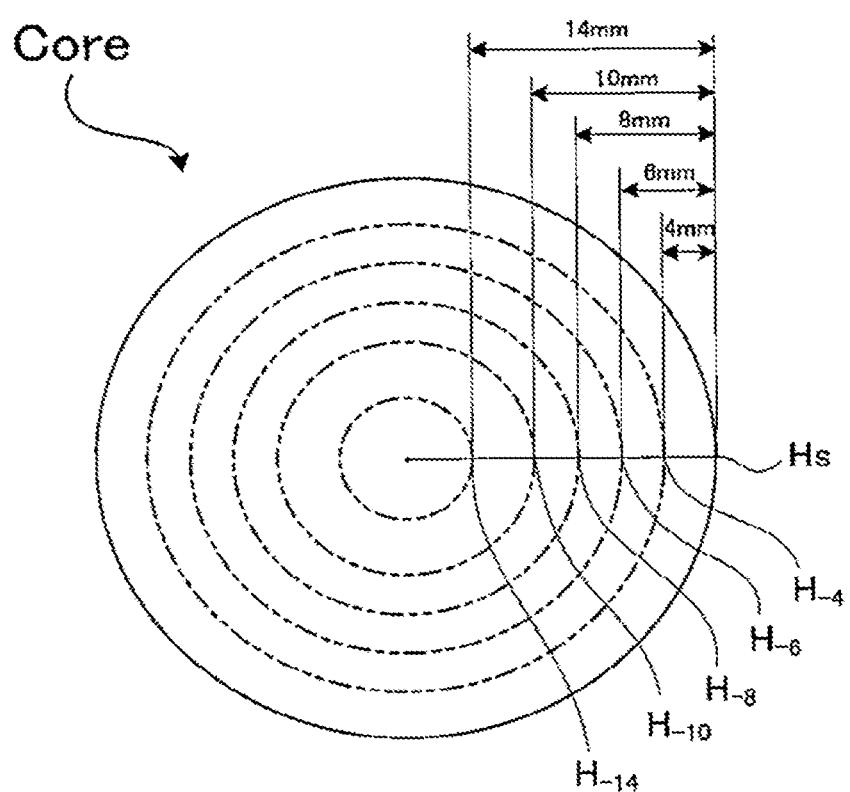
FIG. 10 is a schematic diagram of the core illustrating the prescribed positions in the core hardness profile.

Next, using the respective resin materials shown in Table 2, an envelope layer, an intermediate layer and an outermost layer were formed in this order over the core by injection molding, thereby forming a three-layer cover. A common dimple configuration I (338 dimples; a plan view of the dimple pattern is shown in FIG. 2) was used for the dimples. The dimples were formed, during injection molding of the outermost layer, by impression with numerous outermost layer-forming protrusions provided on the spherical surface of the mold cavity.

TABLE 2

|  | (1) | (2) | (3) | (4) | (5) |
|---|---|---|---|---|---|
| HPF 1000 | 100 |  |  |  |  |
| Himilan 1605 |  |  | 50 |  |  |
| Himilan 1557 |  |  | 15 |  |  |
| Himilan 1706 |  |  | 35 |  |  |
| Nucrel AN4319 |  | 20 |  |  |  |
| Nucrel AN4221C |  | 80 |  |  |  |
| Magnesium stearate |  | 60 |  |  |  |
| Magnesium oxide |  | 1.7 |  |  |  |
| Trimethylolpropane |  |  | 1.1 |  |  |
| T8295 |  |  |  |  | 75 |
| T8290 |  |  |  | 37.5 | 25 |
| T8283 |  |  |  | 62.5 |  |
| Titanium oxide |  |  |  | 3.8 | 3.8 |
| Polyethylene wax |  |  |  | 1.4 | 1.4 |
| Isocyanate compound |  |  |  | 7.5 | 7.5 |

Numbers in the table indicate parts by weight.

Details on the above materials are given below.

HPF 1000: An ionomer available from E.I. DuPont de Nemours & Co.

Himilan: Ionomers available from DuPont-Mitsui Polychemicals Co., Ltd.

Nucrel: Available from DuPont-Mitsui Polychemicals Co., Ltd.

Magnesium oxide: Available as "Kyowamag MF150" from Kyowa Chemical Industry Co., Ltd.

T8925, T8290, T8283: MDI-PTMG type thermoplastic polyurethanes available under the trade name "Pandex" from DIC Bayer Polymer Polyethylene wax: Available as "Sanwax 161P" from Sanyo Chemical Industries, Ltd.

Isocyanate compound: 4,4'-Diphenylmethane diisocyanate

Physical properties such as hardness of the individual layers and the ball, flight performance (carry), both on shots with a W#1 and on shots with an I#6, and durability on repeated impact were evaluated according to the criteria described below for the golf balls obtained in each of Examples 1 and 2 and Comparative Examples 1 to 5. The results are presented in Table 3. In (1) to (7) below, measurements were carried out in a 23+1° C. environment.

(1) Golf Ball Deflection

The deflection (mm) of the golf ball when compressed at a temperature of 23±1° C. and a rate of 500 mm/min under a final load of 5,880 N (600 kgf) from an initial load state of 98 N (10 kgf) was measured.

(2) Center Hardness of Core

The core was cut into hemispheres and the cut face was rendered into a flat plane, following which a durometer indenter was pressed perpendicularly against the center thereof and measurement was carried out. The JIS-C (JIS K6301-1975 standard, defined similarly below) hardness value is indicated.

(3) Surface Hardness of Core

A durometer was set perpendicular on a surface portion of the spherical core, and the hardness was measured based on the JIS-C hardness standard. The result was indicated as a JIS-C hardness value.

(4) Cross-Sectional Hardness of Core

The core was cut with a fine cutter and, letting $H_{-14}$ be the JIS-C hardness at a position 14 mm in from a surface toward a center of the core, $H_{-10}$ be the JIS-C hardness at a position 10 mm in from the surface toward the center of the core, $H_{-8}$ be the JIS-C hardness at a position 8 mm in from the surface toward the center of the core, $H_{-6}$ be the JIS-C hardness at a position 6 mm in from the surface toward the center of the core, and $H_{-4}$ be the JIS-C hardness at a position 4 mm in from the surface toward the center of the core, the JIS-C hardness value at each of these places was measured. The core cross-sectional hardness profiles in the respective working examples and the comparative examples are shown in the graphs in FIGS. 3 to 9.

(5) Material Hardnesses of Envelope Layer and Intermediate Layer

The resin material for the envelope layer was formed into a sheet having a thickness of 2 mm, and the hardness was measured with a type D durometer in accordance with ASTM-D2240.

(6) Surface Hardness of Intermediate Layer-Covered Sphere

The indenter of a durometer was set substantially perpendicular to the spherical surface of the intermediate layer, and the JIS-C hardness was measured.

(7) Material Hardness of Outermost Layer

The measurement method was the same as in (5) above.

(8) Flight Test

The carry (m) of the ball when struck at a head speed (HS) of 50 m/s with, as the driver (W#1), a TOURSTAGE X-DRIVE 703 (loft angle, 8.5°; manufactured by Bridgestone Sports Co., Ltd.) mounted on a swing robot was measured. The results were rated according to the criteria shown below. The spin rate was the value measured for the ball, immediately after impact, with an apparatus for measuring initial conditions.

Good: Carry was 246 m or more

NG: Carry was less than 246 m (9) Middle Iron (I#6)

The carry (m) of the ball when struck at a head speed of 44 m/s with, as the middle iron, an X-BLADE CB (a number six iron manufactured by Bridgestone Sports Co., Ltd.) was measured. The results were rated according to the following criteria.

Good: Carry was 150 m or more

NG: Carry was less than 150 m

(10) Durability on Repeated Impact

The durability of the golf ball was evaluated using an ADC Ball COR Durability Tester produced by Automated Design Corporation (U.S.). This tester functions so as to fire a golf ball pneumatically and cause it to repeatedly strike two metal plates arranged in parallel. The incident velocity against the metal plates was set at 43 m/s. The number of shots required for the golf ball to crack was measured. The results were rated according to the following criteria.

Good: Number of shots until cracking occurred was 150 or more

NG: Number of shots until cracking occurred was less than 150

TABLE 3

| | | | Example | | Comparative Example | | | | |
|---|---|---|---|---|---|---|---|---|---|
| | | | 1 | 2 | 1 | 2 | 3 | 4 | 5 |
| Core | Diameter (mm) | | 35.4 | 37.7 | 35.4 | 35.4 | 35.4 | 35.4 | 35.4 |
| | Center of core | | 61 | 64 | 60 | 59 | 64 | 59 | 61 |
| | $H_{-14}$ (14 mm in from surface) | | 61 | 64 | 69 | 74 | 72 | 68 | 66 |
| | $H_{-10}$ (10 mm in from surface) | | 63 | 66 | 69 | 76 | 73 | 72 | 69 |
| | $H_{-8}$ (8 mm in from surface) | | 66 | 67 | 69 | 76 | 74 | 72 | 70 |
| | $H_{-6}$ (6 mm in from surface) | | 69 | 73 | 71 | 76 | 77 | 72 | 72 |
| | $H_{-4}$ (4 mm in from surface) | | 78 | 77 | 73 | 77 | 82 | 71 | 77 |
| | $H_S$ (core surface) | | 90 | 82 | 80 | 84 | 84 | 89 | 81 |
| | $H_S - H_{-14}$ | | 29 | 18 | 11 | 10 | 12 | 21 | 15 |
| | $H_{-14} - H_{-8}$ | | 12 | 10 | 4 | 1 | 8 | −1 | 7 |
| Cover | Envelope layer | Material | (1) | | (2) | (1) | (1) | (1) | (1) |
| | | Thickness (mm) | 1.7 | | 1.7 | 1.7 | 1.7 | 1.7 | 1.7 |
| | | Sheet D hardness | 51 | | 55 | 51 | 51 | 51 | 51 |
| | Intermediate layer | Material | (3) | (3) | (3) | (3) | (3) | (3) | (3) |
| | | Thickness (mm) | 1.1 | 1.7 | 1.1 | 1.1 | 1.1 | 1.1 | 1.1 |
| | | Sheet D hardness | 62 | 62 | 62 | 62 | 62 | 62 | 62 |
| | | JIS-C hardness at surface of intermediate layer | 98 | 98 | 98 | 98 | 98 | 98 | 98 |
| | Outermost layer | Material | (4) | (5) | (4) | (4) | (4) | (4) | (4) |
| | | Thickness (mm) | 0.8 | 0.8 | 0.8 | 0.8 | 0.8 | 0.8 | 0.8 |
| | | Sheet D hardness | 44 | 47 | 44 | 44 | 44 | 44 | 44 |
| Ball | Deflection (mm) under 600 kg load | | 8.2 | 8.8 | 8.2 | 8.4 | 8.4 | 8.8 | 8.9 |
| Flight | W#1, HS, 50 m/s | Initial velocity (m/s) | 73 | 73 | 74 | 74 | 74 | 73 | 73 |
| | | Spin rate (rpm) | 2,455 | 2,383 | 2,507 | 2,478 | 2,488 | 2,453 | 2,413 |
| | | Carry (m) | 247 | 246 | 246 | 245 | 245 | 245 | 246 |
| | | Rating | good | good | good | NG | NG | NG | good |
| | I#6 | Initial velocity (m/s) | 55 | 55 | 54 | 54 | 54 | 54 | 54 |
| | | Spin rate (rpm) | 6,279 | 5,851 | 6,735 | 6,623 | 6,661 | 6,525 | 6,205 |
| | | Carry (m) | 150 | 152 | 148 | 149 | 149 | 149 | 151 |
| | | Rating | good | good | NG | NG | NG | NG | good |
| Durability on repeated impact (43 m/s) | | | good | good | good | NG | good | good | NG |

As shown in Table 3 above, the golf balls obtained in the examples of the invention had an excellent flight performance when struck using a W#1 and an I#6, and also had a good durability. By contrast, the balls obtained in Comparative Examples 1 to 5 either had a poor flight performance when a W#1 or an I#6 was used, or had a poor durability.

The invention claimed is:

1. A golf ball comprising a core and a cover of at least one layer, wherein the core is formed of a rubber composition including a base rubber, sulfur and an organosulfur compound and the amount of sulfur is from 0.01 to 0.085 parts by weight per 100 parts by weight of the base rubber, and the core has a cross-sectional hardness which, letting ($H_{-14}$) be a JIS-C hardness at a position 14 mm in from a surface toward a center of the core, ($H_{-8}$) be a JISC hardness at a position 8 mm in from the surface toward the center of the core, ($H_{-6}$) be a JIS-C hardness at a position 6 mm in from the surface toward the center of the core, and ($H_{-4}$) be a JIS-C hardness at a position 4 mm in from the surface toward the center of the core, satisfies the formulas (1) to (4) below:

$$H_{-14} < 70 \quad (1)$$

$$H_{-8} < 72 \quad (2)$$

$$H_{-6} < 75, \text{ and} \quad (3)$$

$$H_{-4} - H_{-8} > 8. \quad (4)$$

2. The golf ball of claim 1, wherein the ball has a deflection, when compressed under a final load of 5,880 N (600 kgf) from an initial load state of 98 N (10 kgf), of from 7 to 10 mm.

3. The golf ball of claim 1, wherein the core further comprises an organic peroxide having a one-minute half-life temperature of from about 165° C. to about 185° C.

4. The golf ball of claim 1, wherein the core has a diameter of from 32 to 41 mm.

5. The golf ball of claim 1, wherein the core is composed of a single layer.

6. The golf ball of claim 1, wherein the core is formed from a rubber composition which includes a crosslinking initiator in an amount of from 0.1 to 5.0 parts by weight, per 100 parts by weight of a base rubber.

7. The golf ball of claim 1, wherein the core is formed from a rubber composition which includes sulfur in an amount of from 0.005 to 0.5 parts by weight, per 100 parts by weight of a base rubber.

8. The golf ball of claim 1, wherein the core is formed from a rubber composition which includes an organosulfur compound in an amount of from 0.05 to 5 parts by weight, per 100 parts by weight of a base rubber.

9. The golf ball of claim 1, wherein the $H_{-14}$ value is from 58 to 70.

10. The golf ball of claim 1, wherein the $H_{-8}$ value is from 66 to 72.

11. The golf ball of claim 1, wherein the JIS-C hardness at the core center is from 61 to 70.

12. The golf ball of claim 1, wherein the JIS-C hardness difference between the surface of the core and the center of the core is from 18 to 29.

13. The golf ball of claim 1, wherein the JIS-C hardness difference between the surface of the core and the $H_{-14}$ value is from 16 to 20.

* * * * *